Oct. 24, 1933.  G. A. JOHNSON  1,931,495
FRICTION SHOCK ABSORBING MECHANISM
Filed Aug. 6, 1932   2 Sheets-Sheet 1
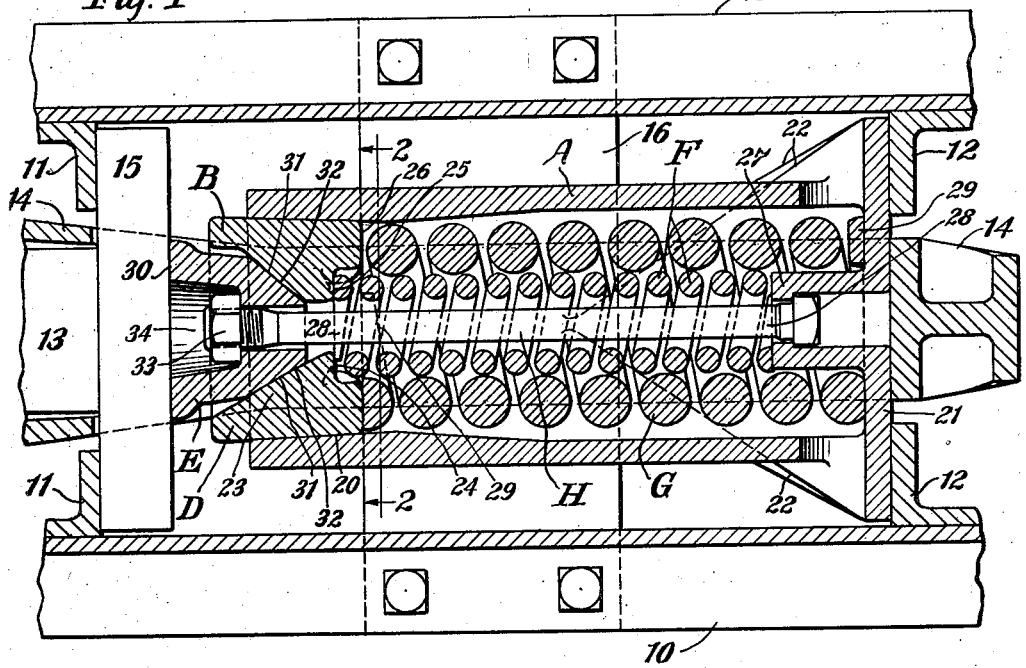
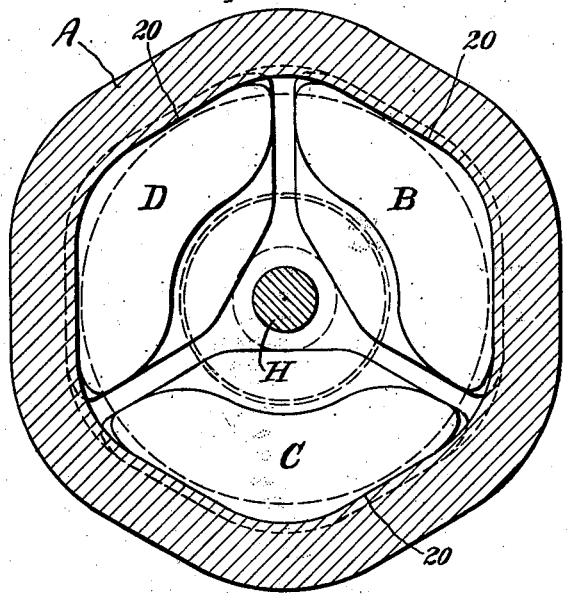
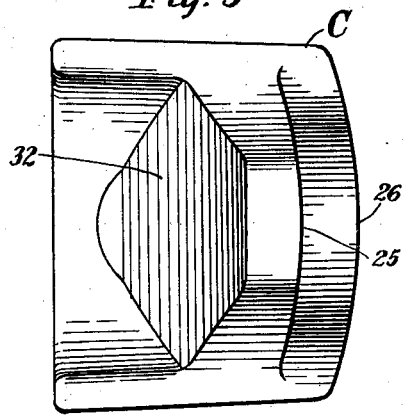
Inventor
George A. Johnson
By Henry Fuchs, Atty.

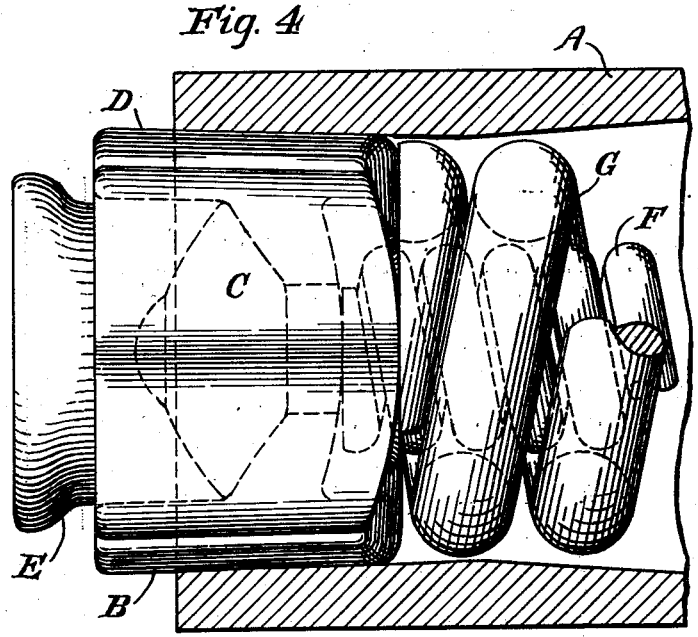
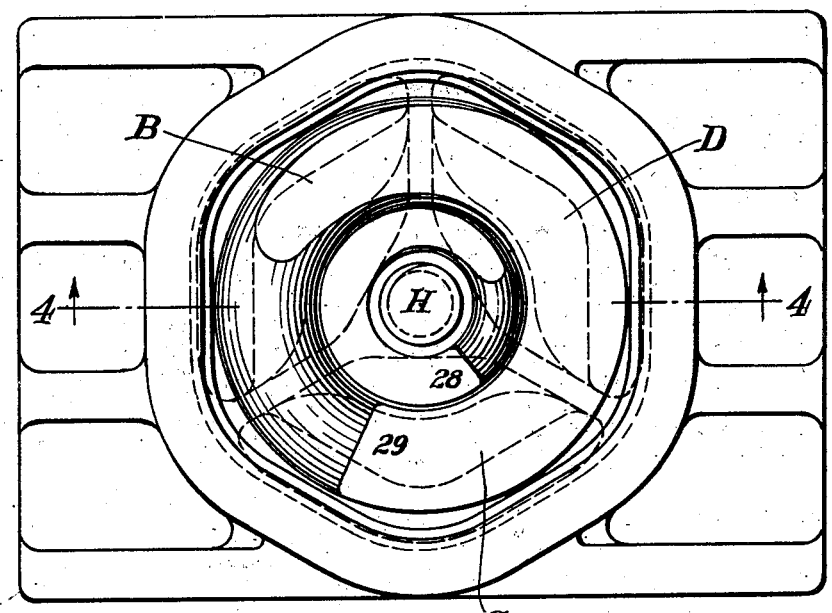

Patented Oct. 24, 1933

1,931,495

UNITED STATES PATENT OFFICE 1,931,495

FRICTION SHOCK ABSORBING
MECHANISM

George A. Johnson, Chicago, Ill., assignor to
W. H. Miner, Inc., Chicago, Ill., a corporation
of Delaware Application August 6, 1932. Serial No. 627,703

7 Claims. (Cl. 213—32)

This invention relates to improvements in friction shock absorbing mechanisms.

In the operation of railway cars, damage to the car and its lading has been found to be mainly due to the shock absorbing mechanism of the draft rigging in not functioning properly to cushion the shocks occurring in buffing and draft actions. This improper cushioning of the shocks is likely to occur through release of the shock absorbing mechanism being impeded when there is a tendency of some of the working parts of the mechanism to stick or jamb. In exhaustive tests made in connection with high capacity friction shock absorbing mechanisms of the tapered friction cylinder type employing friction shoes having their movement inwardly of the cylinder resisted by spring means comprising coil spring members, improper release, when it occurred, was found to be caused by a tendency of the parts of the friction means to stick due in part to displacement and binding of the spring cap employed between the shoes and the inner coil of the spring resistance. Although it was determined in connection with the testing of this type of shock absorbing mechanism that the binding between the spring cap and shoes was one of the contributing factors in improper release, the principal cause of such improper release was found to be due to binding between the coil spring and the shoes, with resultant displacement and binding of the shoes.

The main object of my invention is to overcome these defects in connection with friction shock absorbing mechanisms of the tapered friction cylinder type employing a main spring resistance comprising inner and outer coils by providing direct bearing engagement between the shoes of the friction system and both the inner and outer coils of the spring resistance and so designing the spring abutment portions of the shoes that binding between the shoes and coils of the spring is entirely eliminated.

A more specific object of the invention is to do away with the danger of sticking of the parts of the friction system of a friction shock absorbing mechanism of the character described in the preceding paragraph by preventing binding between the parts thereof through the use of shoes having rounded spring abutment faces which are crowned and on which the outer ends of the coils of the spring resistance bear.

Other objects of the invention will more clearly appear from the description and claims hereinafter following.

In the drawings, forming a part of this specification, Figure 1 is a longitudinal, sectional view through the underframe structure of a railway car, illustrating my improvements in connection therewith, the section through the friction shell being on two intersecting planes disposed at an angle of 120 degrees with respect to each other. Figure 2 is a transverse, vertical, sectional view, on an enlarged scale, corresponding substantially to the line 2—2 of Figure 1. Figure 3 is a plan view of the inner side of one of the friction shoes of my improved shock absorbing mechanism illustrated in Figure 1. Figure 4 is a longitudinal, sectional view through the forward end portion of the friction shell or cylinder of the shock absorbing mechanism involving my improvements, the section corresponding substantially to the line 4—4 of Figure 5, looking upward in said figure, said view showing the shoes and springs in elevation. And Figure 5 is a front end elevational view, on an enlarged scale, of the shock absorbing mechanism, looking toward the right in Figure 1, the friction shoes being indicated in dotted lines to more clearly illustrate the coil spring arrangement.

In said drawings, 10—10 indicate the channel-shaped center or draft sills of a railway car underframe structure, to the inner sides of which are secured the usual front stop lugs 11—11 and rear stop lugs 12—12. The inner end of the rear coupler shank is indicated by 13, and a hooded yoke 14 is connected thereto. My improved shock absorbing mechanism and a main front follower 15 are disposed within the yoke, and the yoke is supported by a saddle plate 16 secured to the lower flanges of the draft sills 10—10.

My improved friction shock absorbing mechanism comprises broadly a friction shell A; three friction shoes B, C, and D; a wedge E; a spring resistance comprising an inner coil F and an outer coil G; and a retainer bolt H.

The friction shell A is of hexagonal cross section, as clearly shown in Figures 2 and 5, and has inwardly converging, substantially V-shaped, interior friction surfaces 20—20—20 at the forward end thereof. At the rear end, the friction shell A is provided with a transverse end wall 21, which is extended laterally beyond opposite sides of the shell to provide an integral main follower member. The projecting portions of the rear wall are suitably reinforced by webs 22—22, which are formed integral with the side walls of the friction shell A.

The friction shoes B, C, and D are of substantially the same design, with the exception that the shoe D has the wedge face thereof, which cooperates with the wedge block E, disposed at a keener angle with respect to the longitudinal axis of the mechanism than the corresponding wedge faces of the other two shoes. The wedge face of each shoe is formed on an inward enlargement 23 of the shoe. Said enlargement 23 is offset forwardly with respect to the inner end of the shoe, thereby providing a seat 24 for the forward end of the inner coil F of the spring resistance. The seat 24 has a transverse bottom wall 25, which forms the spring abutment means of the seat 24 of the shoe. The wall 25 of the seat 24 of each shoe is of substantially the outline shown in Figure 2 and is rearwardly rounded, as shown in Figure 3, to provide a crowned face which is engaged by the end of the coil F of the spring resistance. The rear end of each shoe presents a transverse abutment face 26 for the forward end of the outer coil G of the spring resistance. The face 26 of each shoe is also rearwardly rounded to provide a crowned surface, as shown most clearly in Figure 3.

The spring resistance comprising the coils F and G yieldingly opposes inward movement of the three shoes B, C, and D of the friction means. The inner coil F has the rear end thereof bearing on a hollow boss 27 projecting forwardly from the rear wall 21 of the friction shell A. The forward end of the coil G bears on the rounded and crowned surfaces 26 of the friction shoes B, C, and D. The tangs at the opposite ends of the coil F of the spring are indicated by 28—28. As is common, the tangs 28—28 are flattened so as to provide proper bearing engagement with the spring abutments of the shoes and boss 27. The tang 28 at the forward end of the coil F of the spring resistance is so disposed that the end portion of said tang bears at the center of the rounded and crowned end face or wall 25 of the seat 24 of the corresponding shoe C. The outer coil G of the spring resistance, which is heavier than the inner coil, has its opposite ends bearing on the rear wall 21 of the friction shell and the inner ends of the shoes B, C, and D. The tangs at the opposite ends of the coil G are indicated by 29—29 and are flattened similarly to the tangs of the inner coil F of the spring resistance. The end portion of the tang 29 at the forward end of the coil G of the spring resistance engages substantially the central portion of the rounded and crowned end face 26 of the shoe C.

The wedge E, which cooperates with the friction shoes, is of the usual design and has a flat outer end face 30 bearing on the inner side of the follower 15. At the inner end, the wedge block is provided with three flat wedge faces 31—31—31, which cooperate respectively with the wedge faces 32—32—32 of the three shoes B, C, and D.

The parts of the mechanism are held assembled and of uniform overall length by the retainer bolt H, which has the head thereof anchored within the hollow boss 27 of the rear wall of the friction shell and has the front end anchored to the wedge E by means of a nut 33 disposed within the pocket 34 provided in the wedge block.

The operation of my improved friction shock absorbing mechanism during a compression stroke is as follows: The wedge block E is moved inwardly of the friction shell A, thereby wedging the friction shoes apart and compressing the spring resistance comprising the coils F and G. During inward movement of the shoes, the friction created between the friction surfaces of the shoes and the shell augments the resistance due to the compression of the springs F and G. In release, the expansive action of the coils F and G of the spring resistance forces the shoes outwardly, thereby returning the wedge block to the normal position shown in Figure 1. Outward movement of the wedge block is limited by the retainer bolt H.

The crowned spring abutment faces of the shoes ensure perfect release of the gear at all times, because all binding or sticking which would occur due to rotation of the spring resistance is eliminated by crowning the shoes. The centrally crowned portions of the spring abutment faces of the shoes provide bearing contact at fixed points on the ends of the spring coils F and G, thereby overcoming rotation of the springs produced by the crowding action exerted on the ends of the coils by the flat faced end abutments of the usual shoes. By doing away with all rotation of the spring coils, binding action between the springs and shoes due to engagement of the ends of the tangs of the springs with the side edges of the shoes is completely avoided.

In assembling the mechanism, the two coils F and G of the spring resistance are preferably disposed as shown in Figures 2 and 5 so that the tangs 28 and 29 at the forward ends thereof will bear near the centers of the crowned abutment faces 25 and 26 of the shoe C, as shown in Figures 2, 4, and 5. This ensures that the ends of the tangs are at all times spaced from the side edge of the adjacent shoe. However, even if the springs are not assembled with the other parts in the manner pointed out, the danger of the tangs of the springs binding on the shoes is reduced to a minimum because the crowns of the shoe bearing on the tangs of the springs will tend to hold the extremities of the tangs clear of the side edges of the adjacent shoe.

It is further pointed out that by providing direct engagement between the forward end of the inner coil F of the spring resistance and the spring abutment faces 25—25—25 of the three shoes, the use of the usual central spring cap is entirely dispensed with and the binding due to the employment of such a cap is completely eliminated.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; of a plurality of friction shoes having sliding frictional engagement with the friction surfaces of the shell, said shoes having rounded spring abutment faces; a wedge block having wedging engagement with the shoes; and a main spring resistance within the shell opposing inward movement of the shoes, said spring resistance including an outer coil having the front end thereof bearing directly on the rounded spring abutment faces of the shoes.

2. In a friction shock absorbing mechanism, the combination with a friction shell having inwardly converging friction surfaces; of friction means cooperating with the friction surfaces of the shell, said friction means including a plurality of friction shoes having rounded rear abutment faces; and spring resistance means within the shell opposing inward movement of the shoes, said spring resistance means including a coil having its outer end bearing on the rounded abutment surfaces of the shoes.

3. In a friction shock absorbing mechanism, the combination with a friction shell having a series of inwardly converging friction surfaces; of friction means cooperating with the friction surfaces of the shell, said friction means including a series of friction shoes having rounded spring abutment faces; and spring resistance means within the shell opposing inward movement of the shoes, said spring resistance means including inner and outer coils having their outer ends bearing directly on the rounded abutment faces of the shoes.

4. In a friction shock absorbing mechanism, the combination with a friction shell having a series of interior, inwardly converging friction surfaces; of a series of friction shoes having sliding frictional engagement with the friction surfaces of the shell, each shoe having a centrally crowned rear abutment face; a wedge block having wedging engagement with the shoes; and a coil spring within the shell opposing inward movement of the shoes, said coil spring having the outer end thereof bearing on the crowned rear abutment faces of the shoes.

5. In a friction shock absorbing mechanism, the combination with a friction shell having interior friction surfaces; of a friction shoe having sliding engagement with each friction surface, each shoe having inner and outer rear abutment faces, said faces being centrally crowned; a wedge block having wedging engagement with the shoes; and inner and outer coil springs within the shell having their forward ends bearing respectively on the inner and outer abutment faces of said shoes.

6. In a friction shock absorbing mechanism, the combination with a friction shell having inwardly converging, interior friction surfaces; of a plurality of friction shoes cooperating respectively with said friction surfaces, each shoe having inner and outer rear abutment faces, said faces being rounded to provide a centrally crowned portion on each face; a wedge block having wedging engagement with the shoes; and inner and outer coil springs within the friction shell, each coil spring having the usual tangs at opposite ends, said coils having the outer ends thereof bearing on the rounded abutment faces of the shoes with the forward end sections of the tangs of said springs bearing on the crowned portions of said abutment faces of one of said shoes.

7. In a friction shock absorbing mechanism, the combination with a friction shell having interior, converging friction surfaces; of a plurality of friction shoes having frictional engagement with the surfaces of the shell, said shoes having forwardly offset seats at the inner ends thereof, the inner end faces of said shoes and the bottom walls of said seats being rearwardly rounded to provide centrally crowned spring abutment faces; a wedge block having wedging engagement with the shoes; and a main spring resistance within the shell opposing inward movement of the shoes, said spring resistance including inner and outer coils, said outer coil bearing directly on the rounded inner end faces of the shoes and said inner coil having its front end extending into said seats and bearing on the rounded bottom walls thereof.

GEORGE A. JOHNSON.